(12) United States Patent  (10) Patent No.: US 9,264,392 B2
Garcia  (45) Date of Patent: *Feb. 16, 2016

(54) DYNAMIC TAGGING RECOMMENDATION

(71) Applicant: Facebook, Inc., Menlo Park, CA (US)

(72) Inventor: David Harry Garcia, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 123 days.

This patent is subject to a terminal disclaimer.

(21) Appl. No.: 14/104,622

(22) Filed: Dec. 12, 2013

(65) Prior Publication Data

US 2014/0101275 A1  Apr. 10, 2014

Related U.S. Application Data

(63) Continuation of application No. 13/097,596, filed on Apr. 29, 2011, now Pat. No. 8,631,084.

(51) Int. Cl.
*G06F 15/16* (2006.01)
*H04L 12/58* (2006.01)
*G06F 17/30* (2006.01)
*G06Q 10/00* (2012.01)

(52) U.S. Cl.
CPC .......... *H04L 51/32* (2013.01); *G06F 17/30533* (2013.01); *G06Q 10/00* (2013.01)

(58) Field of Classification Search
CPC ......... H04L 51/32; H04L 51/14; H04L 51/20; G06F 17/30533
USPC .................................................. 709/206, 207
See application file for complete search history.

(56) References Cited

U.S. PATENT DOCUMENTS

| 8,631,084 B2 * | 1/2014 | Garcia .................. 709/207 |
| 2006/0018522 A1 | 1/2006 | Sunzeri |
| 2006/0251292 A1 | 11/2006 | Gokturk et al. |
| 2007/0098303 A1 | 5/2007 | Gallagher |
| 2008/0075338 A1 | 3/2008 | Muramatsu |
| 2008/0152216 A1 | 6/2008 | Meadow et al. |
| 2008/0195657 A1 | 8/2008 | Naaman |
| 2008/0270425 A1 | 10/2008 | Cotgreave |
| 2009/0005987 A1 | 1/2009 | Vengroff et al. |
| 2009/0036902 A1 | 2/2009 | DiMaio et al. |

(Continued)

FOREIGN PATENT DOCUMENTS

| JP | 2008/033755 | 2/2008 |
| KR | 10-2007-0115194 | 12/2007 |

(Continued)

OTHER PUBLICATIONS

P. Papakipos, U.S. Appl. No. 13/074,743, Response to Non-final Office Action filed with U.S. Patent and Trademark Office, Dec. 12, 2013.

(Continued)

*Primary Examiner* — Kristie Shingles
(74) *Attorney, Agent, or Firm* — Baker Botts L.L.P.

(57) ABSTRACT

In one embodiment, a geo-social networking system automatically tags one or more social contacts of a first user to a photo of the first user by ranking the social contacts based on spatial and temporal proximity to the first user, and in response to the first user's selection of one or more top ranked social contacts, associating the selected social contacts to the photo.

21 Claims, 5 Drawing Sheets

(56) References Cited

U.S. PATENT DOCUMENTS

| | | | |
|---|---|---|---|
| 2009/0116049 | A1 | 5/2009 | Takenuki |
| 2009/0252383 | A1 | 10/2009 | Adam et al. |
| 2010/0058196 | A1 | 3/2010 | Krishnan et al. |
| 2010/0191728 | A1 | 7/2010 | Reilly |
| 2010/0309225 | A1 | 12/2010 | Gray et al. |
| 2010/0318510 | A1 | 12/2010 | Ryu |
| 2011/0038512 | A1 | 2/2011 | Petrou et al. |
| 2011/0131235 | A1 | 6/2011 | Petrou et al. |
| 2011/0153629 | A1 | 6/2011 | Lehmann et al. |
| 2012/0076367 | A1 | 3/2012 | Tseng |
| 2012/0213404 | A1 | 8/2012 | Steiner |
| 2012/0250950 | A1 | 10/2012 | Papakipos |
| 2012/0278395 | A1 | 11/2012 | Garcia |

FOREIGN PATENT DOCUMENTS

| | | |
|---|---|---|
| WO | 2009/116049 | 9/2009 |
| WO | 2011/017653 | 2/2011 |

OTHER PUBLICATIONS

David H. Garcia, U.S. Appl. No. 13/097,596, Non-final Office Action from U.S. Patent and Trademark Office, Oct. 16, 2012.

David H. Garcia, U.S. Appl. No. 13/097,596, Response to Non-final Office Action filed with U.S. Patent and Trademark Office, Feb. 13, 2013.

David H. Garcia, U.S. Appl. No. 13/097,596, Non-final Office Action from U.S. Patent and Trademark Office, May 30, 2013.

David H. Garcia, U.S. Appl. No. 13/097,596, Response to Non-final Office Action filed with U.S. Patent and Trademark Office, Aug. 15, 2013.

David H. Garcia, U.S. Appl. No. 13/097,596, Notice of Allowance from U.S. Patent and Trademark Office, Aug. 30, 2013.

E. Tseng, U.S. Appl. No. 12/890,283, Office Action from U.S. Patent and Trademark Office, Aug. 15, 2012.

E. Tscng, U.S. Appl. No. 12/890,283, Response to Office Action filed with the U.S. Patent and Trademark Office, Oct. 30, 2012.

E. Tseng, U.S. Appl. No. 12/890,283, Final Office Action from the U.S. Patent and Trademark Office, Dec. 31, 2012.

E. Tseng, U.S. Appl. No. 12/890,283, Request for Continued Examination, Response Under 1.114, Jul. 1, 2013.

E. Tseng, U.S. Appl. No. 12/890,283, Non-Final Office Action from U.S. Patent and Trademark Office, Aug. 22, 2013.

E. Tseng, U.S. Appl. No. 12/890,283, Response to Non-Final Office Action filed with U.S. Patent and Trademark Office, Nov. 19, 2013.

P. Papakipos et al., U.S. Appl. No. 13/074,743, Office Action from the U.S. Patent and Trademark Office, Mar. 29, 2013.

P. Papakipos et al., U.S. Appl. No. 13/074,743, Response to Non-Final Office Action, Jun. 20, 2013.

P. Papakipos et al., U.S. Appl. No. 13/074,743, Final Office Action, Jul. 18, 2013.

P. Papakipos et al., U.S. Appl. No. 13/074,743, Response to Final Office Action filed with U.S. Patent and Trademark Office, Sep. 10, 2013.

P. Papakipos et al., U.S. Appl. No. 13/074,743, Advisory Action from U.S. Patent and Trademark Office, Sep. 20, 2013.

P. Papakipos et al., U.S. Appl. No. 13/074,743, Non-final Office Action from U.S. Patent and Trademark Office, Oct. 10, 2013.

International Search Report and Written Opinion for International Application PCT/US2012/028225, Oct. 23, 2012.

International Search Report and Written Opinion for International Application PCT/US2012/035471, Nov. 28, 2012.

Zhang et al., "Imlooking: Image-based Face Retrieval in Online Dating Profile Search," CHI 2006 *Work-in-Progress*, Apr. 22-27, 2006, Montreal, Quebec, Canada.

O'Hare et al., "Context-Aware Person Identification in Personal Photo Collections," *IEEE Transactions on Multimedia*, vol. 11, No. 2, Feb. 2, 2009.

U.S. Appl. No. 12/890,283, filed Sep. 24, 2010, Tseng.

U.S. Appl. No. 13/074,743, filed Mar. 29, 2011, Papakipos.

\* cited by examiner

DYNAMIC TAGGING RECOMMENDATION

CROSS REFERENCE TO RELATED APPLICATIONS

This application is a continuation of U.S. application Ser. No. 13/097,596 filed Apr. 29, 2011 by David Garcia and entitled "Dynamic Tagging Recommendation".

TECHNICAL FIELD

The present disclosure relates generally to a geo-social networking service that enables users to share photos and videos, and, more particularly, to automatically tagging one or more social contacts of a first user to a photo of the first user based on spatial and temporal proximity to the first user.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interest. The social networking system may also create and store a record of a user's relationship with other users in the social networking system (e.g., social graph), as well as provide services (e.g., wall-posts, photo-sharing, or instant messaging) to facilitate social interaction between users in the social networking system. A geo-social networking system is a social networking system in which geographic services and capabilities are used to enable additional social interactions. User-submitted location data or geo-location techniques (e.g., mobile phone position tracking) can allow a geo-social network system to connect and coordinate users with local people or events that match their interests. For example, users can check-in to a place using a mobile client application by providing a name of a place (or selecting a place from a pre-established list of places). The geo-social networking system, among other things, can record information about the user's presence at the place and possibly provide this information to other users of the geo-social networking system.

SUMMARY

Particular embodiments relate to automatically tagging one or more social contacts of a first user to a photo of the first user based on spatial and temporal proximity to the first user. These and other features, aspects, and advantages of the disclosure are described in more detail below in the detailed description and in conjunction with the following figures.

DETAILED DESCRIPTION

Figure 1:
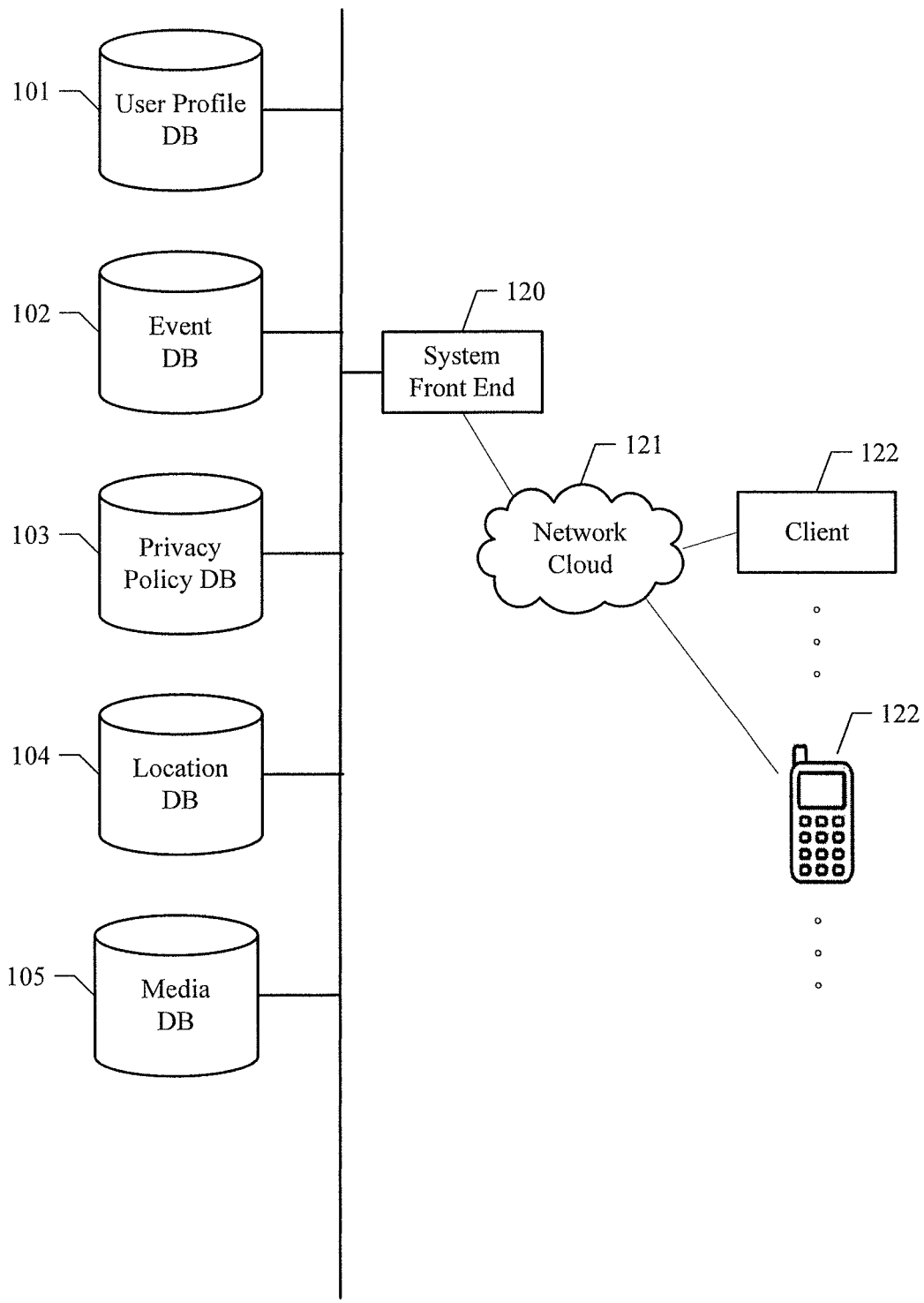
FIG. 1 illustrates an example social networking system.

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A social networking system may support a variety of applications, such as photo sharing, on-line calendars and events. For example, the social networking system may also include media sharing capabilities. For example, the social networking system may allow users to post photographs and other multimedia files to a user's profile, such as in a wall post or in a photo album, both of which may be accessible to other users of the social networking system. Social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times, dates, locations and identities of other users.

The social networking system may also support a privacy model. A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user and/or select settings that apply globally or to categories or types of user profile information. A privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item indexable and searchable on the Internet). A user may choose a default privacy setting for all user data that is to be posted. Additionally, a user may specifically exclude certain entities from viewing a user datum or a particular type of user data.

Social networking system may maintain a database of information relating to geographic locations or places. Places may correspond to various physical locations, such as restaurants, bars, train stations, airports and the like. In one implementation, each place can be maintained as a hub node in a social graph or other data structure maintained by the social networking system, as described in U.S. patent application Ser. No. 12/763,171, which is incorporated by reference herein for all purposes. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. A check-in to a given place may occur when a user is physically located at a place and, using a mobile device, access the geo-social networking system to register the user's presence at the place. A user may select a place from a list of existing places near to the user's current location or create a new place. The social networking system may automatically checks in a user to a place based on the user's current location and past location data, as described in U.S. patent application Ser. No. 13/042,357 filed on Mar. 7, 2011, which is incorporated by reference herein for all purposes. An entry including a comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. The check-in activity may also be displayed on a user profile page and in news feeds provided to users of the social networking system.

Still further, a special purpose client application hosted on a mobile device of a user may be configured to continuously capture location data of the mobile device and send the location data to social networking system. In this manner, the social networking system may track the user's location and provide various recommendations to the user related to places that are proximal to the user's path or that are frequented by the user. In one implementation, a user may opt in to this recommendation service, which causes the client application to periodically post location data of the user to the social networking system.

FIG. 1 illustrates an example social networking system. In particular embodiments, the social networking system may store user profile data and social graph information in user profile database 101. In particular embodiments, the social networking system may store user event data in event database 102. For example, a user may register a new event by accessing a client application to define an event name, a time and a location, and cause the newly created event to be stored in event database 102. For example, a user may register with an existing event by accessing a client application to confirming attending the event, and cause the confirmation to be stored in event database 102. In particular embodiments, the social networking system may store user privacy policy data in privacy policy database 103. In particular embodiments, the social networking system may store geographic and location data in location database 104. In particular embodiments, the social networking system may store media data (e.g., photos, or video clips) in media database 105. In particular embodiments, databases 101, 102, 103, 104, and 105 may be operably connected to the social networking system's front end. In particular embodiments, the front end 120 may interact with client device 122 through network cloud 121. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network. Front end 120 may include web or HTTP server functionality, as well as other functionality, to allow users to access the social networking system. Network cloud 121 generally represents a network or collection of networks (such as the Internet or a corporate intranet, or a combination of both) over which client devices 122 may access the social network system.

In particular embodiments, location database 104 may store an information base of places, where each place includes a name, a geographic location and meta information (such as the user that initially created the place, reviews, comments, check-in activity data, and the like). Places may be created by administrators of the system and/or created by users of the system. For example, a user may register a new place by accessing a client application to define a place name and provide a geographic location and cause the newly created place to be registered in location database 104. As discussed above, a created place may correspond to a hub node, which an administrator can claim for purposes of augmenting the information about the place and for creating ads or other offers to be delivered to users. In particular embodiments, system front end 120 may construct and serve a web page of a place, as requested by a user. In some embodiments, a web page of a place may include selectable components for a user to "like" the place or check in to the place. In particular embodiments, location database 104 may store geo-location data identifying a real-world geographic location of a user associated with a check-in. For example, a geographic location of an Internet connected computer can be identified by the computer's IP address. For example, a geographic location of a cell phone equipped with cellular, Wi-Fi and/or GPS capabilities can be identified by cell tower triangulation, Wi-Fi positioning, and/or GPS positioning. In particular embodiments, location database 104 may store a geographic location and additional information of a plurality of places. For example, a place can be a local business, a point of interest (e.g., Union Square in San Francisco, Calif.), a college, a city, or a national park. For example, a geographic location of a place (e.g., a local coffee shop) can be an address, a set of geographic coordinates (latitude and longitude), or a reference to another place (e.g., "the coffee shop next to the train station"). For example, additional information of a place can be business hours, photos, or user reviews of the place. In particular embodiments, location database 104 may store a user's location data. For example, a user can create a place (e.g., a new restaurant or coffee shop) and the social networking system can store the created place in location database 104. For example, location database 104 may store a user's check-in activities. For example, location database 104 may store a user's geographic location provided by the user's GPS-equipped mobile device.

In particular embodiments, a user of the social networking system may upload one or more media files to media database 105. For example, a user can upload a photo or a set of photos (often called a photo album), or a video clip to media database 105 from a client device 122 (e.g., a computer, or a camera phone). In particular embodiments, the one or more media files may contain metadata (often called "tags") associated with each media file. For example, a photo shot by a digital camera may contain metadata relating to file size, resolution, time stamp, name of the camera maker, and/or location (e.g., GPS) coordinates. In one implementation, the client device 122 may implement the Exchangeable image file format (Exif), or a modified version thereof. A user can add additional metadata values to a photo, or tag a photo, during or in connection with an upload process. Some examples of tags of a media file are author, title, comments, event names, time, location, names of people appearing in the media file, or user comment. In particular embodiments, a user may tag a media file by using a client application (e.g., a photo or video editor), or entering one or more tags in a graphical user interface of a media uploading tool that uploads a user's one or more media files from a client device 122 to the social networking system. A user may also tag a media file after an upload at a later time in the social networking system's web site. In particular embodiments, the social networking system may also extract metadata from a media file and store the metadata in media database 105. Particular embodiments herein describe methods of automatically tagging one or more users to a media file.

Figure 2:
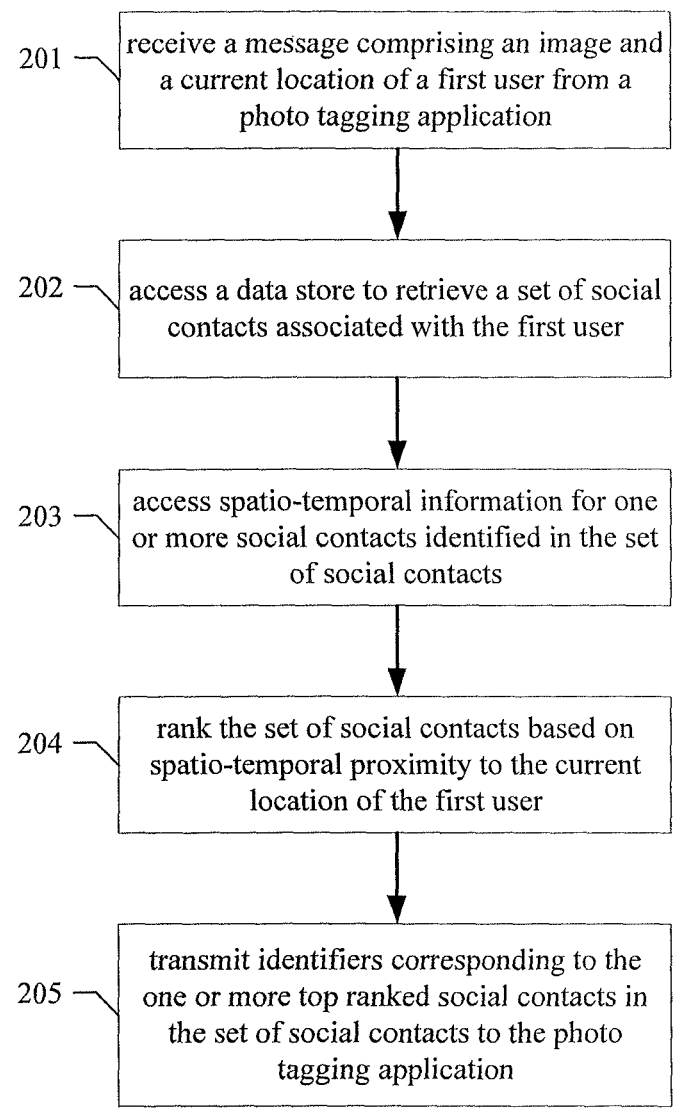
FIG. 2 illustrates an example method of automatically associating or tagging one or more users to an image file based on social and spatio-temporal proximity.

FIG. 2 illustrates an example method of automatically associating or tagging one or more users to an image file based on social and spatio-temporal proximity. FIG. 2 can be implemented, at least in part, by a user tagging process hosted by one or more computing devices of the social networking system. The server-side user tagging process may operate in connection with a client-side photo tagging application hosted on one or more client devices. In particular embodiments, the user tagging process may receive a message comprising an image and a current location of a first user from a photo tagging application hosted on a mobile device (201). In particular embodiments, an image may be a still photographic picture, a video clip, or a still frame of a video clip. For example, a first user may access a camera application hosted by the first user's GPS-equipped mobile phone, causing a photo tagging application hosted by the user's GPS-equipped mobile phone to transmit a photo tagging request comprising the first user's identifier of the social networking system (e.g., a user name), the user's current location (e.g., GPS coordinates) with a time stamp, and an image captured by the camera application (and stored in a local storage of the mobile phone), or alternatively, an image being displayed by the camera application's viewfinder graphical user interface. Additionally, if a first user's location data is not available from the uploading request (e.g., no GPS signal received by the first user's mobile phone at the time of the request), the user tagging process may access location database 104 to retrieve the first user's most recent location and associated time stamp, for example, the most recent check-in activity, or the most recent recorded GPS coordinates and associated time stamp from the first user's GPS-equipped mobile phone. Other location technologies may also be employed, such as locating the user's device based on cell tower and/or WiFi access point identities corresponding to the access nodes to which the user's device is associated, or using triangulation techniques (e.g., signal strength, time difference of arrival, time of arrival, etc.) based on observed cellular radio network or WiFi signals. Other location technologies may based on detection of other signals, such as BlueTooth or Near Field Communications (NFC) technologies.

In particular embodiments, the user tagging process may access a data store to retrieve a set of social contacts associated with the first user (202). In particular embodiments, the user tagging process may access a data store to retrieve a set of users who are within a pre-determined social proximity to the first user. For example, the user tagging process can access user profile 101 based on the user identifier of the first user, to retrieve a set of users who are within a configurable degree (e.g., one or two degrees) of separation from the first user.

In particular embodiments, the user tagging process may access spatio-temporal information for one or more social contacts identified in the set of social contacts (203). For example, the user tagging process may access location database 104 for current or most recent location data for one or more users of the set of social contacts associated with the first user. For example, the user tagging process may access event database 102 for current or most recent event data for one or more users of the set of social contacts associated with the first user. In some embodiments, the user tagging process may determine current or most recent location data based on the current or most recent event data for the one or more users of the set of social contacts associated with the first user. In addition, the user tagging process may access a data store of user check-in activity to determine whether one or more users have recently checked in to a given location. Still further, in some implementation, some users may have client devices and associated applications that periodically report a users location to the social networking system. In other implementations, the user tagging process can infer location based on data stored in a user's on-line calendar, status updates regarding a place and time where a user plans to be, or comments to status updates of others indicating a similar intention.

In particular embodiments, the user tagging process may rank the set of social contacts based on spatio-temporal proximity to the current location of the first user (204). For example, the user tagging process can rank one or more users of the set of social contacts who have location data that are within a quarter mile and +/−30 minutes from the first user's current location higher than the rest of users of the set of social contacts. For example, the user tagging process can rank one or more users of the set of social contacts who are attending a same current event as the first user higher than the rest of users of the set of social contacts. The user tagging process may access events database 102 to determine whether other users have registered for or checked-in to an event near the first user's location. In some embodiments, the user tagging process may rank the set of social contacts by assigning a proximity ranking score to each of the set of social contacts based spatio-temporal proximity to the first user's current location. For example, the user tagging process can assign a proximity ranking score of 1.0 to a social contact if the social contact's location data is within 500 feet and +/−15 minutes from the first user's current location, a proximity ranking score of 0.7 to a social contact if the social contact's location data is beyond 500 feet by within 1000 feet, and with +/−30 minutes from the first user's current location, etc.

Additionally, the user tagging process may adjust the ranking of the set of social contacts by matching one or more faces in the image to one or more users of the set of social contacts. In particular embodiments, the user tagging process may identify one or more faces in the image. For example, the user tagging process can identify one or more faces by using face detection software. In other embodiments, the photo tagging application may identify one or more face in the image. For example, the photo tagging application can identify one or more faces by using face detection software and transmit locations and extents in the image corresponding to the one or more identified faces to the user tagging process. Yet in another embodiment, the first user may identify one or more faces in the image. For example, the first user may select one or more faces in the image by touch gestures of circling the one or more faces in the image displayed in the first user's mobile phone's touch screen, causing the photo tagging application to transmit locations and extents in the image corresponding to the one or more identified faces to the user tagging process. In some embodiments, the photo tagging application may highlight the one or more identified faces in the image. For example, the photo tagging application can highlight one or more identified faces in an image displayed in a view finder graphical user interface of the first user's mobile phone's camera application by overlaying one or more boxes on the image wherein each box encircles an identified face in the image. For example, a highlight box can encircle and follow movement of an identified face in the view finder graphical user interface.

In particular embodiments, for at least a first face in the one or more identified faces, the user tagging process may match the first face to one or more users of the set of social contacts and adjust the ranking of the set of social contacts based on whether one or more users match the first face. For example, the user tagging process may determine a match between a face and a person (e.g., a profile picture of the person stored in the social networking system) based on application of a facial recognition or matching algorithm that returns a matching score and comparing the score to a threshold value. For example, facial recognition computer software can calculate a correlation coefficient between a potential match and an identified face, where the correlation coefficient ranges from 0.0 ("no correlation at all") to 1.0 ("perfect match"), and determine a match to the identified face if the correlation coefficient is greater than 0.8. Suitable recognition algorithms include Principal Component Analysis, Linear Discriminate Analysis, Elastic Bunch Graph Matching, Hidden Markov model, and Neuronal Motivated Dynamic Link Matching. For example, the user tagging process can access a facial recognition software (e.g., face.com) though the software's API (application program interface). For example, after determining a match between the first face and a particular user of the set of social contact, the user tagging process can rank the particular user to the top of the ranked list, or adjusting the proximity ranking scores for the particular user (e.g., multiplying the proximity ranking score by 1.5 if there's a match to a face, or by 1.0 or no change if there's no match to a face).

Other algorithms may also be employed. For example, the current locations (if any) of users can be used to filter out from consideration all N-degree (where N is configurable) contacts of the first user outside of some defined radius of the current location of the first user, keeping those N-degree contacts of the first user for further consideration. The user tagging process may then apply a facial recognition process to the filtered set of users to return a ranked list of users. A ranking score can be based on one or more of facial recognition scores, spatio-temporal proximity, user-to-user affinity, and degree of separation from the user. Normalization and factor weightings may be applied to adjust the relative influence of these factors. In addition, the weightings can also be adjusted based on the confidence level of the location data. For example, when locations are inferred from status updates, tagging activities and the like, a confidence level that the inferred location is correct can also be used to weight the ranking score for one or more users.

In particular embodiments, the user tagging process may transmit user identifiers (e.g., user names) corresponding to the one or more top ranked social contacts of the set of social contacts to the photo tagging application (205). In some embodiments, the user tagging process may transmit additional user information corresponding to the one or more top ranked social contacts of the set of social contacts to the photo tagging application. For example, the user tagging process can transmit a profile picture, or names of mutual friends between a top ranked social contact and the first user, to the photo tagging application.

In particular embodiments, the photo tagging application may present user information of the top ranked social contacts of the set of social contacts to the first user. For example, the photo tagging application can present user names of top ranked social contacts with the image to the first user. For example, the photo tagging application can present user names of the top ranked social contacts and for each top ranked social contact, a list of names of mutual friends between the top ranked social contact and the first user, with the image to the first user. In particular embodiments, in response to the first user's selection of one or more top ranked users presented to the first user, the photo tagging application may associate or tag the selected users to the image. In particular embodiments, the photo tagging application may transmit the first user's selection to the user tagging process, causing the user tagging process to present the image to the one or more selected users. For example, the user tagging process can transmit the image to a selected user's mobile phone, causing a special-purpose client application hosted by the selected user's mobile phone to present the image to the selected user. In particular embodiments, the user tagging process may store the image in a data store. For example, the user tagging process can store the image and associated information (e.g., user identifiers for one or more users tagged in the image) in media database 105.

Figure 3:
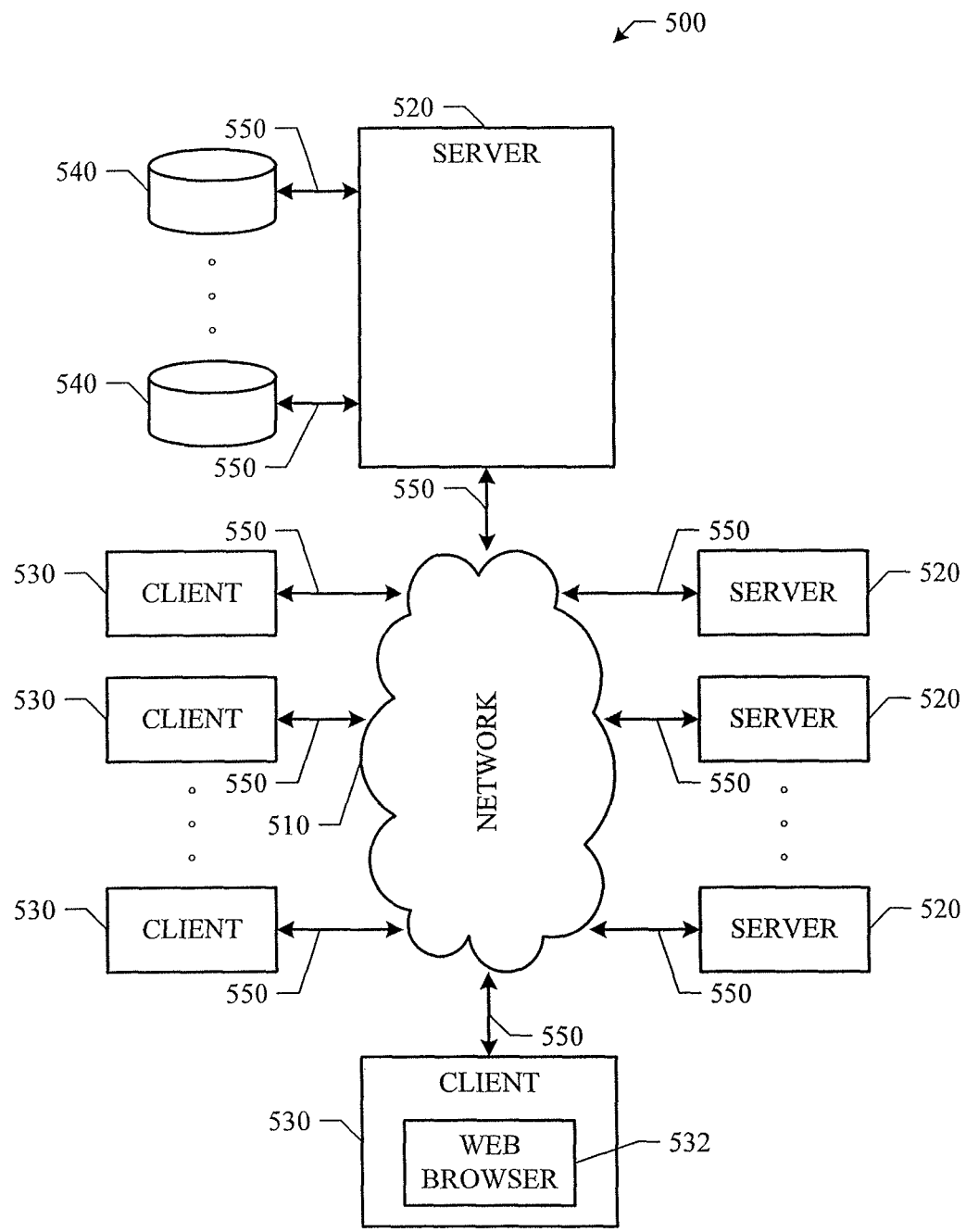
FIG. 3 illustrates an example network environment.

While the foregoing embodiments may be implemented in a variety of network configurations, the following illustrates an example network environment for didactic, and not limiting, purposes. FIG. 3 illustrates an example network environment 500. Network environment 500 includes a network 510 coupling one or more servers 520 and one or more clients 530 to each other. Network environment 500 also includes one or more data storage 540 linked to one or more servers 520. Particular embodiments may be implemented in network environment 500. For example, social networking system frontend 120 may be written in software programs hosted by one or more servers 520. For example, event database 102 may be stored in one or more storage 540. In particular embodiments, network 510 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 510. The present disclosure contemplates any suitable network 510. One or more links 550 couple a server 520 or a client 530 to network 510. In particular embodiments, one or more links 550 each includes one or more wired, wireless, or optical links 550. In particular embodiments, one or more links 550 each includes an intranet, an extranet, a VPN, a LAN, a WLAN, a WAN, a MAN, a portion of the Internet, or another link 550 or a combination of two or more such links 550. The present disclosure contemplates any suitable links 550 coupling servers 520 and clients 530 to network 510.

Figure 4:
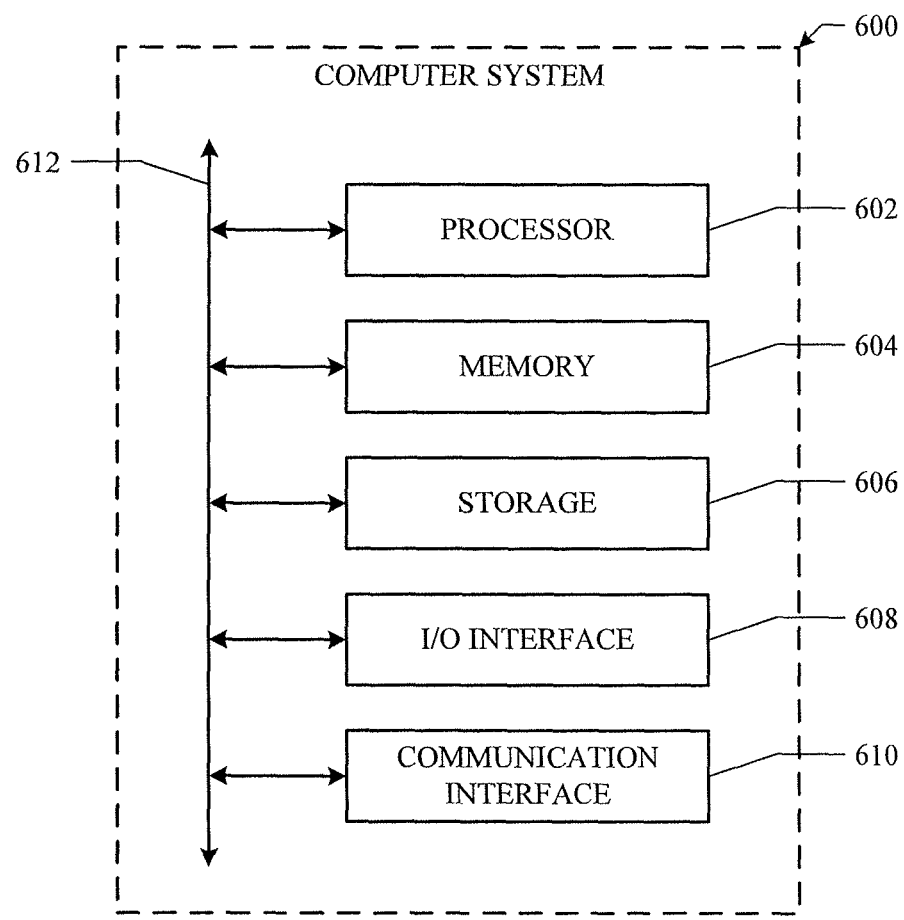
FIG. 4 illustrates an example computer system.

FIG. 4 illustrates an example computer system 600, which may be used with some embodiments of the present invention. This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network (such as, for example, a 802.11a/b/g/n WI-FI network, a 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, a Long Term Evolution (LTE) network), or other suitable wireless network or a combination of two or more of these.

Figure 5:
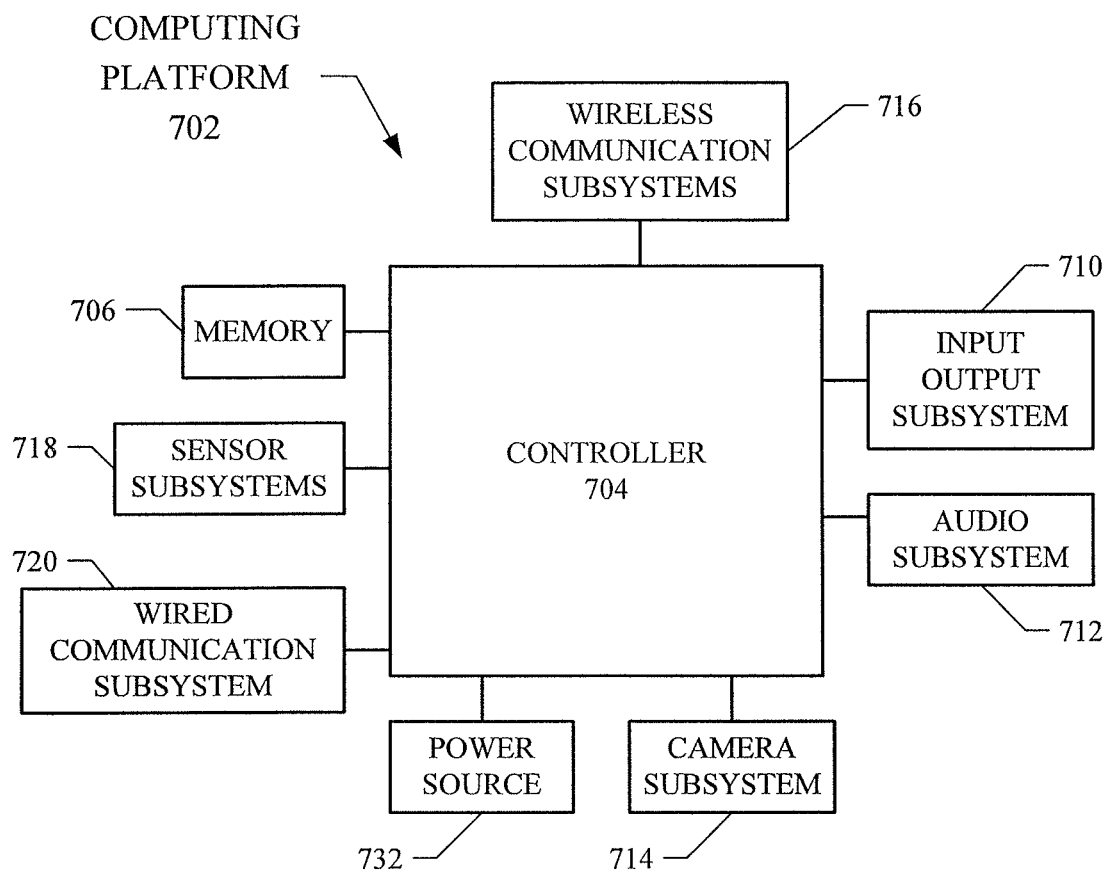
FIG. 5 illustrates an example mobile device platform.

The client-side functionality described above can be implemented as a series of instructions stored on a computer-readable storage medium that, when executed, cause a programmable processor to implement the operations described above. While the client device 122 may be implemented in a variety of different hardware and computing systems, FIG. 5 shows a schematic representation of the main components of an example computing platform of a client or mobile device, according to various particular embodiments. In particular embodiments, computing platform 702 may comprise controller 704, memory 706, and input output subsystem 710. In particular embodiments, controller 704 which may comprise one or more processors and/or one or more microcontrollers configured to execute instructions and to carry out operations associated with a computing platform. In various embodiments, controller 704 may be implemented as a single-chip, multiple chips and/or other electrical components including one or more integrated circuits and printed circuit boards. Controller 704 may optionally contain a cache memory unit for temporary local storage of instructions, data, or computer addresses. By way of example, using instructions retrieved from memory, controller 704 may control the reception and manipulation of input and output data between components of computing platform 702. By way of example, controller 704 may include one or more processors or one or more controllers dedicated for certain processing tasks of computing platform 702, for example, for 2D/3D graphics processing, image processing, or video processing.

Controller 704 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code and/or data may be physically stored within memory 706 that is operatively coupled to controller 704.

Memory 706 may encompass one or more storage media and generally provide a place to store computer code (e.g., software and/or firmware) and data that are used by computing platform 702. By way of example, memory 706 may include various tangible computer-readable storage media including Read-Only Memory (ROM) and/or Random-Access Memory (RAM). As is well known in the art, ROM acts to transfer data and instructions uni-directionally to controller 704, and RAM is used typically to transfer data and instructions in a bi-directional manner. Memory 706 may also include one or more fixed storage devices in the form of, by way of example, hard disk drives (HDDs), solid-state drives (SSDs), flash-memory cards (e.g., Secured Digital or SD cards, embedded MultiMediaCard or eMMD cards), among other suitable forms of memory coupled bi-directionally to controller 704. Information may also reside on one or more removable storage media loaded into or installed in computing platform 702 when needed. By way of example, any of a number of suitable memory cards (e.g., SD cards) may be loaded into computing platform 702 on a temporary or permanent basis.

Input output subsystem 710 may comprise one or more input and output devices operably connected to controller 704. For example, input output subsystem may include keyboard, mouse, one or more buttons, thumb wheel, and/or, display (e.g., liquid crystal display (LCD), light emitting diode (LED), Interferometric modulator display (IMOD), or any other suitable display technology). Generally, input devices are configured to transfer data, commands and responses from the outside world into computing platform 702. The display is generally configured to display a graphical user interface (GUI) that provides an easy to use visual interface between a user of the computing platform 702 and the operating system or application(s) running on the mobile device. Generally, the GUI presents programs, files and operational options with graphical images. During operation, the user may select and activate various graphical images displayed on the display in order to initiate functions and tasks associated therewith. Input output subsystem 710 may also include touch based devices such as touch pad and touch screen. A touchpad is an input device including a surface that detects touch-based inputs of users. Similarly, a touch screen is a display that detects the presence and location of user touch inputs. Input output system 710 may also include dual touch or multi-touch displays or touch pads that can identify the presence, location and movement of more than one touch inputs, such as two or three finger touches.

In particular embodiments, computing platform 702 may additionally comprise audio subsystem 712, camera subsystem 712, wireless communication subsystem 716, sensor subsystems 718, and/or wired communication subsystem 720, operably connected to controller 704 to facilitate various functions of computing platform 702. For example, Audio subsystem 712, including a speaker, a microphone, and a codec module configured to process audio signals, can be utilized to facilitate voice-enabled functions, such as voice recognition, voice replication, digital recording, and telephony functions. For example, camera subsystem 712, including an optical sensor (e.g., a charged coupled device (CCD), or a complementary metal-oxide semiconductor (CMOS) image sensor), can be utilized to facilitate camera functions, such as recording photographs and video clips. For example, wired communication subsystem 720 can include a Universal Serial Bus (USB) port for file transferring, or a Ethernet port for connection to a local area network (LAN). Additionally, computing platform 702 may be powered by power source 732.

Wireless communication subsystem 716 can be designed to operate over one or more wireless networks, for example, a wireless PAN (WPAN) (such as, for example, a BLUETOOTH WPAN, an infrared PAN), a WI-FI network (such as, for example, an 802.11a/b/g/n WI-FI network, an 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, and/or a Long Term Evolution (LTE) network). Additionally, wireless communication subsystem 716 may include hosting protocols such that computing platform 702 may be configured as a base station for other wireless devices. Sensor subsystem 718 may include one or more sensor devices to provide additional input and facilitate multiple functionalities of computing platform 702. For example, sensor subsystems 718 may include GPS sensor for location positioning, altimeter for altitude positioning, motion sensor for determining orientation of a mobile device, light sensor for photographing function with camera subsystem 714, temperature sensor for measuring ambient temperature, and/or biometric sensor for security application (e.g., fingerprint reader). Other input/output devices may include an accelerometer that can be used to detect the orientation of the device.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a MultiMediaCard (MMC) card, an embedded MMC (eMMC) card, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method, by one or more computing devices, comprising:
   receiving, at a computing device, a message including a multimedia file, the message sent by a computing device of a first user;
   determining a location of the first user;
   accessing a data store to retrieve a set of social contacts associated with the first user;
   accessing spatio-temporal information for one or more social contacts identified in the set of social contacts;
   prior to conducting a face matching procedure based on the multimedia file, ranking the set of social contacts based on spatio-temporal proximity to the location of the first user; and
   sending identifiers corresponding to the one or more top ranked social contacts in the set of social contacts to the computing device of the first user.

2. The method of claim 1 further comprising adjusting the ranked user list of the first user's social contacts by:
   identifying one or more faces in the multimedia file; and
   for at least a first face in the one or more identified faces:
      matching the at least a first face to one or more social contacts; and
      adjusting the ranked user list based on an indication of a match to the at least a first face.

3. The method of claim 1 further comprising:
   in response to the first user's selection of one or more top ranked users presented to the first user, associating the selected users to the multimedia file.

4. The method of claim 3 further comprising:
   presenting the multimedia file to the one or more selected users.

5. The method of claim 3 further comprising:
   storing the multimedia file in a data store.

6. The method of claim 1 wherein the location of the first user is determined based on one or more of:
   location-based data included in the message;
   location-based data accessed from a data store;
   one or more global positioning system (GPS) coordinates associated with the computing device of the first user;
   an association of the computing device of the first user with one or more access nodes; or
   one or more signals received or sent by the computing device of the first user.

7. The method of claim 1 wherein the location of the first user comprises one or more of:
   a current location of the first user;
   a recent location of the first user; or
   a location the first user has checked-in to.

8. A non-transitory computer-readable storage medium containing computer program code operative, when executed, to cause one or more processors to:
- receive, at a computing device, a message including a multimedia file, the message sent by a computing device of a first user;
- determine a location of the first user;
- access a data store to retrieve a set of social contacts associated with the first user;
- access spatio-temporal information for one or more social contacts identified in the set of social contacts;
- prior to conducting a face matching procedure based on the multimedia file, rank the set of social contacts based on spatio-temporal proximity to the location of the first user; and
- send identifiers corresponding to the one or more top ranked social contacts in the set of social contacts to the computing device of the first user.

9. The computer-readable storage medium of claim 8 further comprising instructions operative to cause the one or more processors to: adjust the ranked user list of the first user's social contacts by:
- identifying one or more faces in the multimedia file; and
- for at least a first face in the one or more identified faces:
  - matching the at least a first face to one or more social contacts; and
  - adjusting the ranked user list based on an indication of a match to the at least a first face.

10. The computer-readable storage medium of claim 8 further comprising instructions operative to cause the one or more processors to:
- in response to the first user's selection of one or more top ranked users presented to the first user, associate the selected users to the multimedia file.

11. The computer-readable storage medium of claim 10 further comprising instructions operative to cause the one or more processors to:
- present the multimedia file to the one or more selected users.

12. The computer-readable storage medium of claim 10 further comprising instructions operative to cause the one or more processors to:
- store the multimedia file in a data store.

13. The computer-readable storage medium of claim 8 wherein the location of the first user is determined based on one or more of:
- location-based data included in the message;
- location-based data accessed from a data store;
- one or more global positioning system (GPS) coordinates associated with the computing device of the first user;
- an association of the computing device of the first user with one or more access nodes; or
- one or more signals received or sent by the computing device of the first user.

14. The computer-readable storage medium of claim 8 wherein the location of the first user comprises one or more of:
- a current location of the first user;
- a recent location of the first user; or
- a location the first user has checked-in to.

15. An apparatus, comprising
- a memory;
- one or more interfaces;
- one or more processors; and
- a computer-readable storage medium storing instructions operative, when executed, to cause the one or more processors to:
  - receive a message including a multimedia file, the message sent by a computing device of a first user;
  - determine a location of the first user;
  - access a data store to retrieve a set of social contacts associated with the first user;
  - access spatio-temporal information for one or more social contacts identified in the set of social contacts;
  - prior to conducting a face matching procedure based on the multimedia file, rank the set of social contacts based on spatio-temporal proximity to the location of the first user; and
  - send identifiers corresponding to the one or more top ranked social contacts in the set of social contacts to the computing device of the first user.

16. The apparatus of claim 15 wherein the storage medium further comprises instructions operative to cause the one or more processors to: adjust the ranked user list of the first user's social contacts by:
- identifying one or more faces in the multimedia file; and
- for at least a first face in the one or more identified faces:
  - matching the at least a first face to one or more social contacts; and
  - adjusting the ranked user list based on an indication of a match to the at least a first face.

17. The apparatus of claim 15 wherein the storage medium further comprises instructions operative to cause the one or more processors to:
- in response to the first user's selection of one or more top ranked users presented to the first user, associate the selected users to the multimedia file.

18. The apparatus of claim 17 wherein the storage medium further comprises instructions operative to cause the one or more processors to:
- present the multimedia file to the one or more selected users.

19. The apparatus of claim 17 wherein the storage medium further comprises instructions operative to cause the one or more processors to:
- store the multimedia file in a data store.

20. The apparatus of claim 15 wherein the location of the first user is determined based on one or more of:
- location-based data included in the message;
- location-based data accessed from a data store;
- one or more global positioning system (GPS) coordinates associated with the computing device of the first user;
- an association of the computing device of the first user with one or more access nodes; or
- one or more signals received or sent by the computing device of the first user.

21. The apparatus of claim 15 wherein the location of the first user comprises one or more of:
- a current location of the first user;
- a recent location of the first user; or a location the first user has checked-in to.

* * * * *